United States Patent [19]

Pelta

[11] 3,832,894
[45] Sept. 3, 1974

[54] CHASSIS DYNAMOMETER
[75] Inventor: Edmond R. Pelta, Pacific Palisades, Calif.
[73] Assignee: Autoscan, Inc., Los Angeles, Calif.
[22] Filed: Sept. 10, 1969
[21] Appl. No.: 856,535

[52] U.S. Cl. ................................................. 73/117
[51] Int. Cl. ............................................. G01l 5/13
[58] Field of Search .................. 73/116, 117, 136 C

[56] References Cited
UNITED STATES PATENTS

| | | | |
|---|---|---|---|
| 2,685,199 | 8/1954 | Wilson et al. | 73/136 X |
| 2,982,128 | 5/1961 | Gibson et al. | 73/117 |
| 3,057,192 | 10/1962 | Huffman et al. | 73/117 |
| 3,099,154 | 7/1963 | Vanderbilt, Jr. | 73/117.3 |
| 3,128,622 | 4/1964 | Lebow | 73/136 C |
| 3,333,463 | 8/1967 | Hollinghurst | 123/102 X |
| 3,453,874 | 7/1969 | Cline | 73/135 |

OTHER PUBLICATIONS

Knudsen, R. F. "Inertia — Electronically." Article from ISA Journal, Apr. 1958, Vol. 5, No. 4, Pages 52–54.

Primary Examiner—Jerry W. Myracle
Attorney, Agent, or Firm—Smyth, Roston & Pavitt

[57] ABSTRACT

A test apparatus including a dynamometer for applying a load to the engine of a vehicle and a control system for controlling the load applied to the dynamometer so that the load represents or simulates actual known driving conditions. One component of the load applied by the dynamometer is a function of the simulated slope of the driving surface on which the vehicle is running and other components of the load are dependent upon simulated vehicle velocity.

16 Claims, 4 Drawing Figures

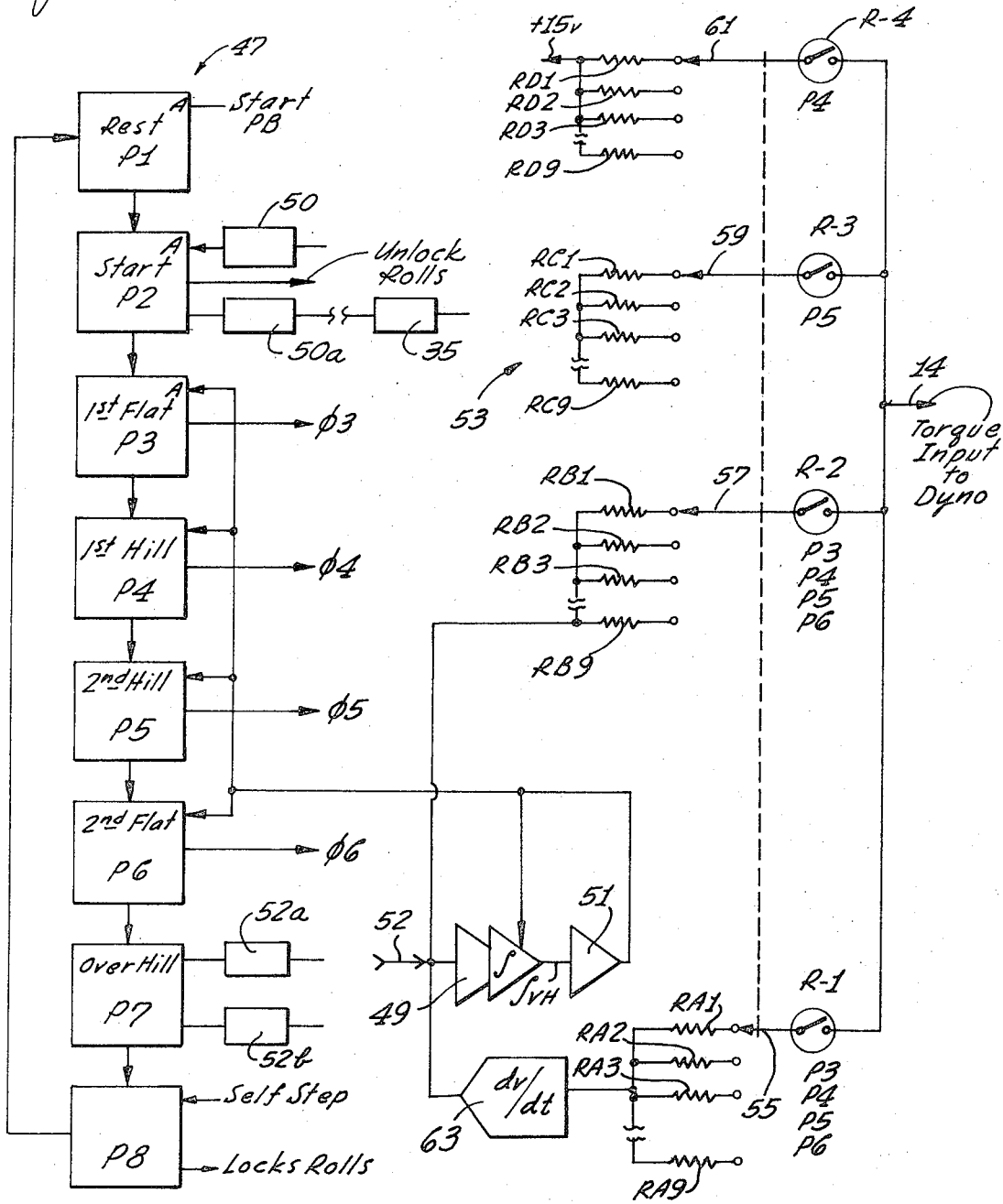

CHASSIS DYNAMOMETER

BACKGROUND OF THE INVENTION

Dynamometers are typically used to apply loads to engines for testing purposes. Although the classic use of dynamometer is in horsepower measurement, such use of the dynamometer is actually of minor importance.

A major use of a dynamometer is the application of a resistive load to the engine of a motor vehicle in an effort to simulate various actual road or operating conditions such as uphill driving. As used herein, the expression "load on the engine" includes a load applied to the engine and/or the drive train components. One problem is the controlling of the dynamometer so that the operator knows what road conditions are being simulated.

Movement of a vehicle along a road is resisted by a force which is a function of numerous factors. These factors are known to those skilled in the art and include the weight of the vehicle, wind resistance, friction, vehicle acceleration, vehicle velocity, road slope, etc.

A conventional dynamometer has a control system which can be manually controlled to provide a known load or torque on the vehicle engine. The difficulty with this system is that the operator does not know what actual driving conditions correspond to the known applied load. Thus, the operator does not know what the applied load represents in terms of road slope, windage, acceleration and velocity of the vehicle, friction and the other factors affecting the actual travel of a vehicle along a road. Accordingly, it is necessary for the operator to calculate for the particular vehicle under test values for the various operating parameters which correspond to the applied load. This is time consuming and requires a high degree of operator skill.

With prior art devices, the load applied must be manually varied. This makes it difficult or impossible to accurately conduct some tests such as an acceleration test as the simulated load should continuously be changed as the vehicle accelerates. Of course, it is not possible for the calculations to be run fast enough to permit the operator to continuously change the load with vehicle acceleration nor can the controls be operated with sufficient accuracy.

SUMMARY OF THE INVENTION

The present invention solves these problems by providing a test apparatus which requires a minimum of operator skill. The test apparatus of this invention accurately applies to the engine a load which simulates the actual force which would be applied if the vehicle were actually being driven on the road. With the present invention, the load applied by the dynamometer is automatically varied to compensate for the driver dependent factors such as vehicle velocity and acceleration.

The present invention provides a novel dynamometer and control means therefor with the control means supplying a variable electrical control signal for controlling the load which the dynamometer applies to the engine. The control signal is proportional to the load which the dynamometer applies and is automatically varied in accordance with selected operating parameters. Although various parameters may be utilized, it has been found desirable to make the control signal proportional to $K_1 V + K_2 dv/dt + K_3 W \cos\theta$ where:

$K_1$, $K_2$ and $K_3$ are constants;
V represents vehicle velocity;
W is the weight of the vehicle under test; and
$\theta$ is the degree of slope of the road.

The above question can be made to more accurately represent the resistive load on the vehicle by adding terms or refining the terms thereof or its accuracy can be reduced by omitting some of the terms. For example, the $K_1 V$ term represents the wind load on the vehicle and frictional losses. This term could be dropped from the equation and reasonable results would still be obtained; however, as accounting for the $K_1 V$ term is easily accomplished, it is preferred to retain it. Conversely, the accuracy could be improved, for example, if the $K_1 V$ term were $K_1 V^2$ as windload varies more nearly with the square of vehicle velocity. However, as the $K_1 V$ term is sufficiently accurate for most applications, there is no need to provide the additional circuits needed to square simulated vehicle velocity.

An advantage of the present invention is that the control system can be programmed to cause the dynamometer to provide loads corresponding to the load on the engine resulting from driving on road surfaces of different slopes. In a preferred form of the invention, the loads representing several road slopes are applied sequentially for periods equal to driving of the vehicle for predetermined distances such as one-half mile. As the load representing road slope is also a function of vehicle weight, the present invention provides manually adjustable means for adjusting the system to compensate for vehicle weight.

As shown by the above equation, the load is also dependent upon the manner in which the vehicle is driven, i.e., upon vehicle velocity and acceleration. The control system of this invention automatically adjusts the load to account for these velocity dependent factors. Thus, if the operator accelerates the engine thereby simulating vehicle acceleration, the control system automatically causes the dynamometer to increase the load applied to thereby simulate actual vehicle acceleration.

To remove the response time, the dynamometer preferably uses disc brakes to apply the load to the engine. Disc brake calipers characteristically drag on the disc and therefore they can be caused to exert braking power by a short stroke actuator.

According to the present invention, a torque load cell is used to assure that the load applied by the dynamometer will accurately reflect the load which it is commanded by the control system. The load cell is preferably of the strain gage type as strain gages have a long useful life and produce stable results.

One feature of the invention is the use of servo techniques to control the load applied to the car. As part of these servo techniques, the system provides an electrical input signal representing the composite of various factors such as the weight of the car, the velocity and acceleration of the car, wind resistance and the slope of the road. This composite signal causes a load to be imposed upon the car. The load in turn causes an electrical feedback signal to be produced with characteristics representing the load. The input and feedback signals are compared and the load is adjusted so that the input and feedback signals are essentially equal. In this way, the load accurately reflects at each instant the operating conditions which are being simulated at that instant.

BRIEF DESCRIPTION OF THE DRAWINGS

FIG. 3 is a schematic diagram of one form of simulator.

DESCRIPTION OF THE PREFERRED EMBODIMENT

Figure 1:
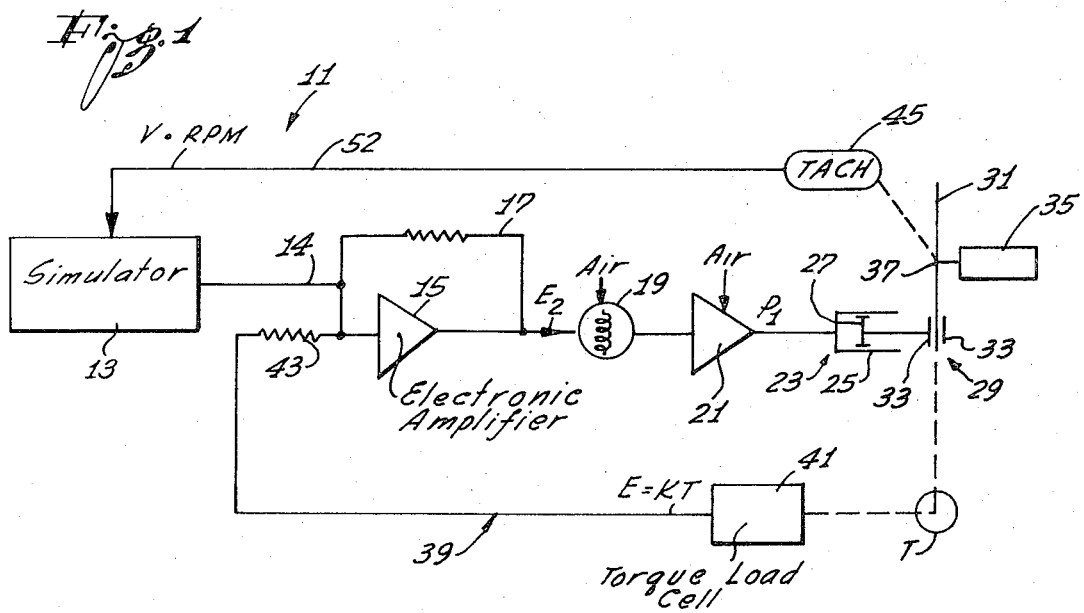
FIG. 1 is a schematic view of a test apparatus constructed in accordance with the teachings of this invention.

Referring to the drawings and in particular to FIG. 1 thereof, reference numeral 11 designates a test apparatus constructed in accordance with the teachings of this invention. The test apparatus 11 includes a simulator 13 which produces an electrical signal which is proportional to the load which is to be applied to the engine. This load is substantially equal to the resistive force which would be applied to the vehicle if the vehicle were actually being driven on the road under predetermined operating conditions.

The signal from the simulator 13 is fed through a lead 14 to an amplifier 15, the gain of which is controlled by a feedback loop 17. The amplified control signal is then fed to an electrical pressure transducer 19 which provides a control air signal proportional to the electrical input signal. The transducer 19 may be of conventional design and is not described in detail herein. The control air signal is then amplified in an amplifier 21 so that the air discharged by the amplifier 21 is of sufficient pressure and in sufficient quantities to operate an actuator 23.

Although the actuator 23 may be of various designs, in the embodiment illustrated it includes a cylinder 25 and a piston 27. The piston 27 is suitably interconnected to control the actuation of a disc brake 29. The disc brake 29 includes a disc 31 and a pair of calipers 33, and the piston 27 is suitably interconnected to the calipers 33 so that movement of the piston to the right causes the calipers to pinch the disc 31 to thereby apply a predetermined and accurately controlled load to the disc.

The disc 31 and one or more rolls 35 are suitably mounted for rotation with a shaft 37. In use of the rolls 35, the engine driven wheels of the vehicle to be tested are positioned in contact with the rolls 35 so that rotation of the wheels by the engine of the vehicle drives the rolls and also the disc 31. This type of dynamometer is known as a chassis dynamometer. Although a chassis dynamometer is preferred, the present invention is not limited to use therewith and other types of dynamometers may be utilized if desired. The dynamometer with which the present invention is utilized, can apply the resistive load to the driving wheels of the vehicle or any other suitable element in the vehicle drive train. Of course, the resistive load applied to the rolls 35 by the disc brake 29 is proportional to the air pressure within the cylinder 25, and this is controlled, as explained above, by the simulator 13.

To improve the accuracy of the test apparatus, a feedback circuit 39 is provided between the disc brake 29 and the input to the electronic amplifier 15. The feedback circuit 39 includes a torque load cell 41 which measures the torque applied by the disc brake 29 and provides an electrical signal which is proportional to the applied torque. This electrical signal is fed back through a resistor 43 where it is algebraically summed with the control signal from the simulator, and the resultant signal constitutes a control signal which is fed into the amplifier 15.

Although various different kinds of torque load cells may be utilized, it is preferred to use a strain gage type load cell as it produces stable results and has a long useful life. As shown in FIG. 2a, the torque load cell 41, preferably includes a conventional bridge circuit 44 with the resistors thereof being arranged on a deflectable beam (not shown) to which the torque applied by the disc brake 29 can be applied. A power source S applies power to the bridge and the bridge is connected to an amplifier 44a. Deflection of the beam results in changing of the resistance of the resistors of the bridge circuit with the result that an output signal is provided which is transmitted to the amplifier 44a and from there is fed to the amplifier 15.

As explained more fully with reference to FIG. 3, the signal provided by the simulator 13 is, at least in part, dependent upon simulated vehicle velocity. Accordingly, in order to provide a velocity input to the simulator 13, a tachometer 45 which is driven by the shaft 37 provides an electrical input to the simulator 13 which is proportional to the rotational speed of the shaft 37 and hence to the speed of the engine of the vehicle. If this input is not equal to the signal on the line 14, the load applied to the disc 31 is adjusted so that the signal from the cell 41 and on the line 14 becomes equal. In this way, the operation of the actuator 23 in applying a load to the disc 31 is controlled at each instant in accordance with the signal on the line 14.

The simulator 13 is shown in greater detail in FIG. 3. The simulator 13 includes a stepping switch 47 which, in the embodiment illustrated, is an 8-position switch with the positions or phases of the stepping switch being designated P1-P8, respectively. The stepping switch 47 is a standard automatic electric stepping switch of the type which is responsive to an electrical pulse input to take one step upon the termination of such pulse.

With the stepping switch 47 in phase P1, the test apparatus is at rest. The stepping switch moves to phase P2 in a conventional manner in response to pushing of a start switch and from phase 2 to phase 3 in response to an electrical pulse which is produced by a suitable velocity response mechanism 50 when the velocity of the rolls 35 exceeds a predetermined value such as a velocity roughly equivalent to a velocity of 2 miles per hour for the vehicle under test. In phase 2 the rolls 35 are unlocked by a suitable device 50a.

The stepping switch 47 is moved automatically and sequentially from phases P3 to P7 by an integrator 49 and a reset generator 51 in a manner described more fully hereinbelow. The stepping switch 47 moves to position P8 in response to an electrical pulse produced by a suitable speed responsive mechanism 52a when the simulated vehicle velocity drops below a predetermined value such as 2 miles per hour. When in position P8, the stepping switch causes energization of appropriate equipment 52b to lock the rolls 35 whereupon the stepping switch returns automatically to position P1.

The signal from the tachometer 45 is fed to a lead 52 which supplies the velocity signal to the integrator 49 (FIG. 3). The output from the integrator 49 is fed to the reset generator 51 which compares the signal from the integrator 49 with a preselected standard and which emits a reset signal when the signal from the integrator reaches a predetermined magnitude. The result of integrating the velocity signal is that the reset signal is emitted after the vehicle has simulated travelling a predetermined distance such as ½ mile. The reset signal resets the integrator and causes the stepping switch 47 to move to the next position. If desired, the reset generator 51 could emit additional signals intermediate those reset signals which are operative to change the position of the stepping switch. These intermediate signals could be used, for example, to illuminate lights on a display board so that the simulated travel of the vehicle along the simulated road surface could be observed by the operator.

Another function of the stepping switch 47 is to operate the relays R-1, R-2, R-3, and R-4. The relays R-1 through R-4 are closed in positions of the stepping switch designated immediately thereadjacent in FIG. 3 and are open for the remainder of the time. Thus, relays R-1 and R-2 are closed in positions P3–P6 while the relays R-3 and R-4 are closed in positions P5 and P4, respectively.

In order that the simulator 13 may take into account the weight of the vehicle under test, a selector switch 53 is provided. The selector switch 53 includes four switch arms 55, 57, 59, and 61 and a plurality of sets of parallel resistors RA1–9, RB1–9, RC1–9, RD1–9, respectively. Each of the sets of resistors includes nine individual resistors of varying ohmic value and the switch arms 55, 57, 59 and 61 are manually movable together by a single selector knob (not shown) to any of the individual resistors. The switch arms move together so that all of the switch arms complete a circuit through a correspondingly numbered resistor. Although a 10 position selector switch 53 has been illustrated, the number of positions of the switch and the number of resistors provided can be varied. Thus, by increasing the number of resistors, it is more likely that the mass of the vehicle can be more accurately taken into account and, by diminishing the number of resistors, it is less likely that the mass of the vehicle will be taken into account as accurately.

The velocity signal from the lead 52 is also fed to a differentiator 63 which differentiates the signal with respect to time and feeds it through whichever of the resistors RA1–RA9 are connected into the circuit by the switch arm 55. The differential of the velocity with respect to time represents an acceleration signal, and it is supplied through the appropriate one of the resistors RA1–RA9. When the stepping switch 47 is in any one of positions P3–P6, the acceleration signal is fed to the lead 14 which leads from the simulator 13 to the amplifier 15 (FIG. 1). Thus, the acceleration signal forms a component of the electrical control signal. The acceleration signal represents the $K_2 dv/dt$ term of the equation set forth hereinabove with the selected resistor RA1–9 representing the constant $K_2$ for the vehicle under test.

The wind and friction resistance which is represented by the $K_1V$ term of the equation set forth above is also velocity dependent. Accordingly, the velocity signal from the lead 52 is fed to the resistors RB1–RB9. The velocity signal flows through the resistor selected by the switch arm 57 and, in phases P3–P6, through the relay R-2 to form a second component of the control signal which is emitted by the simulator 13. The resistors RB1–RB9 represent values of $K_1$ which is a constant representing an approximation of aerodynamic drag and friction losses.

The third factor which the simulator in the specific embodiment illustrated takes into account is the slope of the simulated road surface over which the vehicle is being driven. To account for road surface slope, a voltage source which may be a positive 15 volts is applied to the resistors RC1–9 and RD1–9. The switch arms 59 and 61 are adjusted to select the appropriate resistance corresponding to the weight of the vehicle under test.

In position P4 of the stepping switch 47, current flows through the selected one of the resistors RD1–9 to provide a slope component of the control signal. In position P5 of the stepping switch 47, current flows through the selected one of the resistors RC1–9 to provide a second slope signal. Obviously, the values of the resistors RD1–9 and RC1–9 are selected so that each of the RD resistors simulates a given slope for a particular vehicle while each of the RC resistors provide a different slope. In this manner, the control signal emitted by the simulator 13 is made up by slope, windage and acceleration factors.

Figure 2:
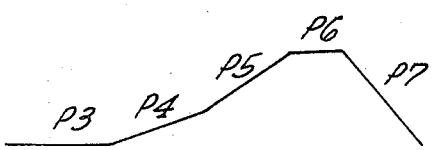
FIG. 2 is a diagrammatic representation of one form of road profile which may be simulated by the test apparatus of this invention.
Figure 2A:
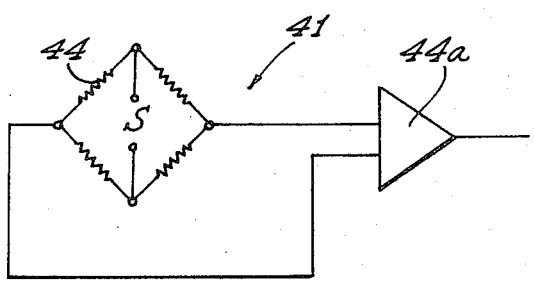
FIG. 2A is a schematic view of a strain gage load cell.

The operation of the test apparatus 11 can be understood with reference, in part, to FIG. 2 which shows an illustrative road profile which the test apparatus 11 simulates. Prior to beginning of the test, the selector switch 53 is set so that the switch arms 55, 57, 59 and 61 connect the appropriate resistors into the circuit to thereby take into account the particular class of vehicle being tested. With the stepping switch in position P1, the start button (not shown) is depressed thereby causing the stepping switch to move to position P2 and in response thereto the rolls 35 are unlocked by the device 50a.

Assuming that the vehicle which is to be tested has been positioned with its rear or driving wheels contiguous to rolls 35, the vehicle can be started and "drive" on the rolls. As soon as the rolls 35 reach an angular velocity corresponding to a vehicle of 2 miles an hour, a pulse is emitted by the velocity responsive mechanism 50 whereupon the stepping switch is automatically moved to position P3. As soon as position P3 is reached, the relays R-1 and R-2 close.

With the rolls 35 being driven, the tachometer 45 in FIG. 1 provides a velocity signal proportional to the simulated velocity of the vehicle under test, and this velocity signal is fed through the differentiator 63 and the selected one of the RA resistors and the closed relay R-1 to provide an acceleration signal component of the control signal in the lead 14. Simultaneously, the velocity signal is also supplied from the lead 52 through the selected RB resistor and the closed relay R-2 to provide a second component of the control signal. As both of the relays R-3 and R-4 are open, the simulated slope is zero, and the control signal is made up entirely of the windage and acceleration factors.

The control signal is amplified in the amplifier 15 (FIG. 1), converted to air signal in the transducer 19 and the resultant air signal is amplified in the amplifier 21 to provide air of the requisite pressure and volume to operate the disc brake 29 as described hereinabove. The torque signal is fed back through the feedback loop 39 and is summed or compared with the control signal from the simulator 13 to provide the input to the amplifier 15. By comparing the feedback signal from the loop 39 with the control signal from the simulator 13, the operation of the amplifier 15 is adjusted so that the signal from the amplifier accurately represents the control signal.

During this time, the disc brake 29 applies a resistive torque to the rolls 35 which is proportional to the control signal. It is apparent that the resistive load applied by the disc brake 29 is variable automatically with changes in the simulated velocity of the vehicle. Thus, should the operator accelerate the vehicle the differentiator would immediately and automatically increase the acceleration signal. This would cause a corresponding increase in the control signal to thereby increase the load applied by the disc brake 29. This increase in load would be substantially equal to the actual force required for such acceleration if the vehicle under test were being driven on the road.

During the time that the rolls 35 are being turned by the vehicle, the integrator 49 receives the velocity signal from the lead 52, and when a predetermined simulated distance has been traversed by the vehicle, the reset generator 51 is operative to emit a signal which resets the integrator and which moves the stepping switch 47 from position P3 to position P4. The profile of the simulated surface travelled by the vehicle under test while the stepping switch 47 was in position P3 can be represented by the flat line designated P3 in FIG. 2, the slope of which is equal to zero.

When the stepping switch 47 moves to position P4, relays R-1 and R-2 remain closed and relay R-4 also closes. This adds an additional component to the control signal, namely, a slope component representing a hill of a predetermined upward slope and designated by the portion of the curve P4 in FIG. 2. This predetermined slope is pre-set into the simulator and is dependent upon the relative values selected for the bank of resistors RD1, RD2 . . . RD9. With the control signal from the simulator 13 thus increased, the load applied by the disc brake 29 to the rolls 35 is correspondingly increased to thereby simulate uphill driving. The slope may be of any preselected amount such as 2° or 3°. The additional load produced by the slope component is substantially equal to the actual load on the engine if the vehicle under test were to climb a hill of corresponding slope.

When the vehicle has travelled the predescribed distance, the reset generator 51 again emits a signal which moves the stepping switch 47 from position P4 to position P5, at which time the relay R-4 opens and the relay R-3 closes with the result that the load applied to the engine now represents, in addition to the windage and acceleration factors, a hill of a new slope which is designated P5 in FIG. 2. This predetermined slope is preset into the simulator and is dependent upon the relative values selected for the bank of resistors RC1, RC2 . . . RC9. For example, if a different slope should be desired, the resistors RC1, RC2 . . . RC9 would be replaced by resistors of different values dependent upon the slope desired.

In the embodiment illustrated, the simulated slope in phase P5 exceeds the simulated slope in phase P4 and may, for example, be 7°. Of course, the acceleration and windage components of the control signal are provided in the same manner as described hereinabove.

When the prescribed distance has been travelled by the vehicle, the reset generator 51 provides another signal which moves the stepping switch 47 to position P6, at which time the relay R-3 opens to again simulate the driving of the vehicle on a flat surface as designated by the portion P6 of the curve in FIG. 2. After travelling on the P6 portion of the curve for the preselected simulated distance, the reset generator 51 emits another electrical signal to move the stepping switch 47 to the position P7 at which time the relays R-1 and R-2 open. Because the rolls are then being driven at a substantial velocity by the vehicle under test, the inertia of the rolls can be utilized to roughly approximate driving down hill as diagrammatically shown by the P7 portion of the curve in FIG. 2. This is only a rough approximation of downhill driving because no energy is being added to the rolls, although this could be done, if desired. Thus, with the switch in the position P7, no control signal is emitted by the simulator 13 and no load is applied by the disc brake 29 to the rolls 35. At the conclusion of the downhill portion of the test, the rolls 35 can be slowed by using the vehicle brakes, and when they reach a speed roughly approximating a vehicle speed of 2 miles per hour, the stepping switch is automatically moved to position P8 in response to an electrical signal from a speed responsive device 52a. In position P8, the locking device 52b is actuated to lock the rolls 35 in position, and the switch 47 automatically moves itself to position P1.

Although particular components for controlling the load applied by the dynamometer to the vehicle under test have been shown and described, any number of such factors may be utilized. Similarly, the simulator road illustrated in FIG. 2 over which the vehicle is "driven" is merely illustrative. Although an exemplary embodiment of the invention has been shown and described, many changes, modifications, and substitutions may be made by one having ordinary skill in the art without necessarily departing from the spirit and scope of this invention.

I claim:

1. A test apparatus for applying a load to the engine of a vehicle wherein the test apparatus is drivingly connected to an element in the vehicle drive train, said test apparatus comprising:

means for providing an electrical velocity signal which varies in accordance with the velocity of said element;

differentiator means responsive to said velocity signal for differentiating said velocity signal to thereby provide an electrical acceleration signal which varies in accordance with the rate of change of the velocity of the element;

means responsive to said velocity signal for emitting a distance signal each time that the element has moved an amount corresponding to actual movement of the vehicle for a predetermined distance;

means for providing a first electrical slope signal which generally corresponds to the force necessary to move the vehicle along a driving surface of a first predetermined slope;

means for providing a second electrical slope signal which generally corresponds to the force necessary to move the vehicle along a driving surface of a second predetermined slope, said slopes being different;

means responsive to one of said distance signals for causing the production of said first electrical slope signal and for preventing the production of said second electrical slope signal;

means responsive to another of said distance signals for preventing the production of said first electrical slope signal and causing the production of said second electrical slope signals;

means for combining said acceleration signal and said slope signals to provide an electrical control signal which is generally proportional to the actual resistive force on the vehicle if the vehicle were actually being driven under conditions corresponding to the simulated conditions; and dynamometer means responsive to said electrical control signal for producing a load on said element which roughly approximates the actual load on such element if the vehicle were being operated on the road under actual conditions corresponding to the simulated conditions.

2. A test apparatus for applying loads to an engine of a vehicle, while the engine is being operated, to simulate various vehicular conditions affecting the load on the engine during the movement of the vehicle along a simulated road, including:

dynamometer means for applying a load to the engine of the vehicle;

control means for supplying a first control signal simulating first particular vehicular conditions and for supplying a second control signal simulating second particular vehicular conditions;

first means coupled to the control means for initially obtaining the production of the first control signal;

second means coupled to the control means and responsive to the simulated operation of the vehicle for a first particular stretch of the simulated road for obtaining the production of the second control signal and discontinuing the production of the first control signal; and means coupled to the first and second means and to the dynamometer means for varying the load applied to the engine initially in accordance with the production of the first control signal and subsequently in accordance with the production of the second control signal.

3. The test apparatus set forth in claim 2 wherein third means are coupled to the control means and responsive to the simulated operation of the vehicle for a second particular stretch of the simulated road for discontinuing the production of the second control signal.

4. A test apparatus for applying loads to an engine of a vehicle, while the engine is being operated, to simulate various vehicular conditions affecting the load on the engine during the movement of the vehicle along a simulated road, including:

first means for providing a first plurality of impedance values representing a first condition in the simulated road, each impedance value in the first plurality representing load conditions for a vehicle of an individual weight with the first conditions in the road;

second means for providing a second plurality of impedance values representing second conditions, different from the first conditions, in the simulated road, each impedance value in the second plurality representing load conditions for a vehicle of an individual weight with the second conditions in the road;

third means coupled to the first and second means for providing a selection of impedance values in the first and second pluralities corresponding to the particular weight of the vehicle;

fourth means for providing a signal representing a particular order of differential of the simulated displacement of the vehicle;

fifth means coupled to the first, second, third and fourth means for providing first control signals having characteristics dependent upon the impedance values selected by the third means in the first plurality of impedance values for the first conditions in the simulated road and upon the signal from the fourth means and for thereafter providing second control signals having characteristics dependent upon the impedance values selected by the third means in the second plurality of impedance values for the second conditions in the simulated road and upon the signal from the fourth means; and dynamometer means sequentially responsive to the first and second control signals from the fifth means for imposing a load on the engine of the vehicle in accordance with the characteristics of such control signals.

5. The test apparatus set forth in claim 4, wherein the first conditions in the simulated road occur for a first particular distance and represent a first slope and wherein the second conditions in the simulated road occur for a second particular distance following the first particular distance and represent a second slope and wherein sixth means are operatively coupled to the fifth means to obtain the production of the first control signals by the fifth means during the simulated movement of the vehicle over the first particular distance and thereafter to obtain the production of the second control signals by the fifth means during the simulated movement of the vehicle over the second particular distance.

6. The apparatus set forth in claim 5 wherein the first means provide the first plurality of impedance values to represent a first slope in the road for vehicles of different weight and wherein the second means provide the second plurality of impedance values to represent a second slope in the road for vehicles of the different weight.

7. A test apparatus for applying loads to an engine of a vehicle, while the engine is being operated, to simulate various vehicular conditions affecting the load on the engine during the movement of the vehicle along a simulated road, including:

first means for providing a first plurality of impedance values representing a particular condition in the simulated road, each impedance in the first plurality representing load conditions for a vehicle of an individual weight with the particular condition in the road;

second means coupled to the first means for providing a selection of impedance values in the first plurality corresponding to the particular weight of the vehicle;

third means for providing signals representing the simulated speed of the vehicle;

fourth means responsive to the signals representing the simulated speed of the vehicle for providing a signal having characteristics representing the acceleration of the vehicle;

fifth means coupled to the first, second and fourth means for providing a control signal having characteristics dependent upon the impedance value selected by the second means and upon the signal from the fourth means; and dynamometer means responsive to the control signal from the fifth means for imposing a load on the engine of the vehicle in accordance with the characteristics of such control signal, the particular condition in the road constituting a slope;

sixth means providing a second plurality of impedance values representing a particular constant for vehicles for an individual weight and wherein the sixth means are mechanically coupled to the second means to select the impedance value in the first plurality, the signal provided by the fourth means being dependent upon the impedance value selected in the second plurality.

8. A test apparatus for applying loads to an engine of a vehicle, while the vehicle is being operated, to simulate various vehicular conditions affecting the load on the engine during the movement of the vehicle along a simulated road, including, a plurality of first means each representing an individual condition for the movement of the vehicle through particular distances along a simulated road;

dynamometer means for controlling the rotation of the wheels of the vehicle;

second means responsive to the rotation of the wheels of the vehicle for measuring the movement of the vehicle through the particular distances along the simulated road; and third means responsive to the simulated movement of the vehicle through the particular distances along the simulated road for sequentially selecting the first means in the plurality to provide the individual conditions represented by such first means.

9. The test apparatus set forth in claim 8 wherein the third means includes a stepping switch responsive to the simulated movement of the vehicle through the particular distances along the simulated road for sequentially selecting the first means in the plurality to provide the individual conditions represented by such first means.

10. The test apparatus set forth in claim 8 wherein means are included for simulating the weight of the automobile to control the rotation by the wheels of the dynamometer means in accordance with such weight.

11. A test apparatus for applying loads to an engine of a vehicle, while the vehicle is being operated, to simulate various vehicular conditions affecting the load on the engine during the movement of the vehicle along a simulated road, including, a plurality of first means each representing an individual condition for the movement of the vehicle through particular distances along a simulated road where the individual conditions include the slope of the road;

dynamometer means for controlling the rotation of the wheels of the vehicle;

means responsive to the rotation of the wheels for providing an indication of the speed of rotation of the wheels;

means responsive to the indication provided by the last mentioned means for differentiating such indication to provide an indication of the acceleration of the wheels of the vehicle;

means responsive to the indication of the speed of rotation of the wheels for providing an indication of the distances through which the wheels of the vehicle have rotated for each individual condition;

selecting means responsive to the indications provided by the last mentioned means of the rotation of the vehicle through the particular distances for the individual conditions for sequentially selecting the first means in the plurality; and control means responsive to the selected ones of the first means in the plurality and to the indications of the acceleration of the wheels of the vehicle for controlling the subsequent operation of the dynamometer means in accordance with such indications.

12. A test apparatus as set forth in claim 11, including, means for providing an indication of the weight of the vehicle, the control means being responsive to the indication of the weight of the vehicle for controlling the subsequent operation of the dynamometer means in accordance with such weight.

13. A test apparatus as set forth in claim 12 wherein the selecting means include a sequential switch.

14. A test apparatus for applying loads to an engine of a vehicle, while the vehicle is being operated, to simulate various vehicular conditions affecting the load on the engine during the movement of the vehicle along a simulated road, including, dynamometer means operative upon the wheels of the vehicle for controlling the rotation of the wheels;

means responsive to the rotation of the wheels of the vehicle for sensing the speed of rotation of the wheels;

means responsive to the speed of rotation of the wheels for differentiating such speed to sense the acceleration of the wheels;

means responsive to the speed of rotation of the wheels for integrating such speed to sense the distance of rotation of the wheels;

a plurality of means each representative of a different road condition for the operation of the vehicle along successive distances along a simulated road where each of the successive distances has a particular value;

means responsive to the simulated movement of the vehicle through the successive distances along the road for sequentially selecting the different means in the plurality; and control means responsive to the road condition represented by the selected one of the means in the plurality and responsive to the simulated acceleration of the vehicle for controlling the operation of the dynamometer means.

15. The test apparatus set forth in claim 14, including,
a plurality of means individually selective to represent the weight of the vehicle, the control means being responsive to the selected one of the means representing the weight of the vehicle for controlling the operation of the dynamometer means in accordance with such weight.

16. The test apparatus set forth in claim 15 in which each of the means representing the different road conditions is adjusted in accordance with the individual selection of the means representing the weight of the vehicle and in which the means representing the acceleration of the vehicle is adjusted in accordance with the individual selection of the means representing the weight of the vehicle.

* * * * *